Sept. 28, 1965  D. C. JENSEN  3,208,884
COMPENSATOR AND RELIEF VALVE FOR LIQUID FILLED BATTERIES
Filed March 1, 1963
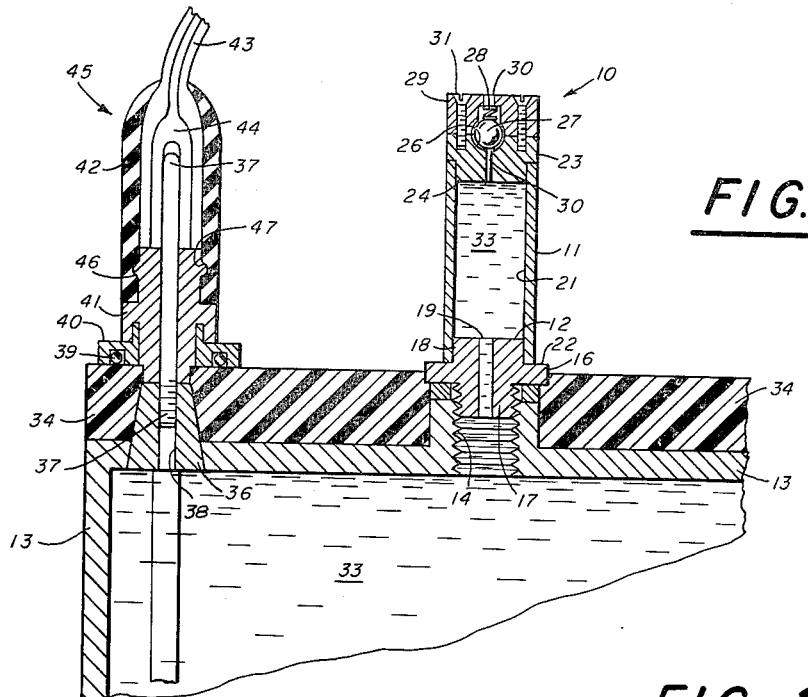
FIG. 3
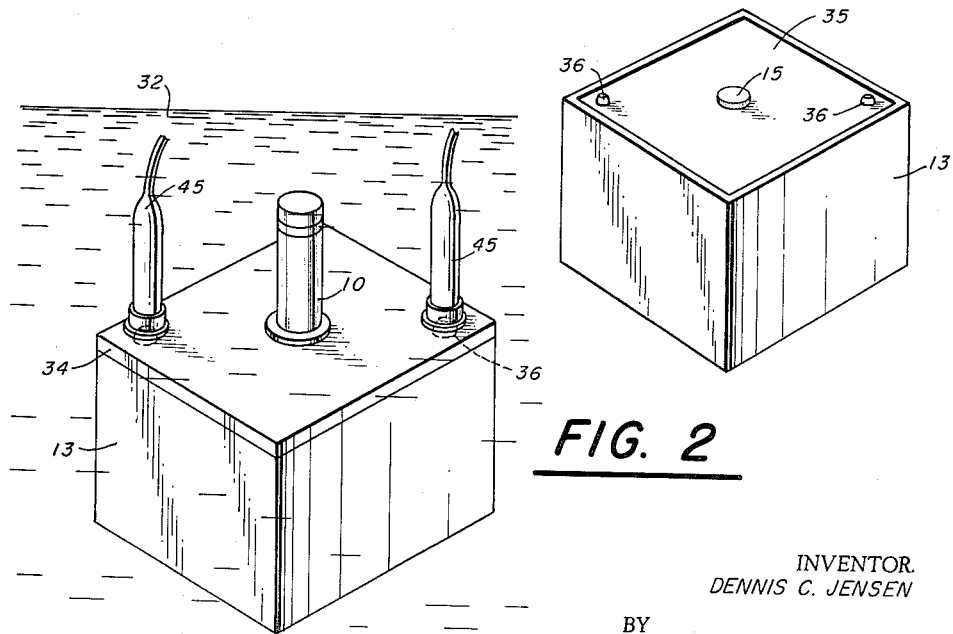
FIG. 1
FIG. 2
INVENTOR.
DENNIS C. JENSEN
BY
ATTORNEYS United States Patent Office 3,208,884
Patented Sept. 28, 1965

3,208,884
COMPENSATOR AND RELIEF VALVE FOR
LIQUID FILLED BATTERIES
Dennis C. Jensen, 1520 E. Wellington,
Santa Ana, Calif.
Filed Mar. 1, 1963, Ser. No. 262,276
9 Claims. (Cl. 136—178)
(Granted under Title 35, U.S. Code (1952), sec. 266)

The invention described herein may be manufactured and used by or for the Government of the United States of America for governmental purposes without the payment of any royalties thereon or therefor.

The invention relates to storage batteries of the liquid electrolytic type employed in surrounding mediums of high pressure wherein the batteries may be subjected to tilting even to the point of invention. More specifically, this invention covers an electrolytic type storage battery adapted for direct immersion and operation in the ocean at several thousand feet deep.

Generally, batteries employed as power sources and immersed directly in the ocean are required to be encased in a protective housing to guard against collapse as a result of hydrostatic pressure at extreme depths. In addition, elaborate means had to be provided for insulating the terminals and relieving the cell electrolyte gas pressure either during charge or discharge of the batteries.

The general object of this invention is to provide simple, inexpensive means adapted for use with an electrolytic battery for overcoming the disadvantages related in, and apparent from, the preceding paragraph.

Another object is to provide a storage battery employing a resilient electrolyte reservoir or bellows for equalizing the internal battery pressure and the changing external hydrostatic pressure.

Another object is to provide a battery equipped with a relief valve for said reservoir and its connecting cell to relieve internal electrolyte gas pressure as a result of charging or discharging of the battery.

Another object is to provide a combination pressure compensator and relief valve adapted to fit and substitute for the filler cap of an eectrolytic battery.

Another object is to provide a potted battery case top and external connections as dielectric protection against shorting during direct immersion in the ocean.

Another object is to provide a water-tight battery pole connector and cable terminal to permit power operation of a battery during direct immersion in the ocean.

Another object is to provide a standard liquid electrolyte battery with means for operating the battery while directly immersed in the ocean.

Other objects and advantages of the device reside in various features of construction, combinations and arrangements of parts, as will hereinafter become more clearly apparent from the following detailed description of a preferred embodiment illustrated in the accompanying drawing in which:

FIG. 1 is a perspective view of a single cell battery provided with standard terminals and a filler cap.

FIG. 2 is a perspective view of the battery shown in FIG. 1 but provided with a potted top, terminal connector, and pressure compensator and relief valve.

FIG. 3 is an enlarged sectional view showing the battery, its potted top, terminal connector and compensator.

In detail the battery is basically of the liquid electrolytic type provided with a standard battery case 13 but having a potted top 34 designed to be equipped with a waterproof terminal connector 45 and a pressure compensator and relief valve 10. The combination compensator and relief valve 10 comprise a bellows in the form of a thin wall plastic polyethelene tube 11 provided at its lower end with an adapter plug 12 having a screw portion 17 for screwing into the battery cap threaded opening 14 of the case 13. The adapter plug 12 is provided with a flanged section 16 and a press fit section 18 designed to fit tightly into the lower end of tube 11 and seal it off from the external fluid of immersion. A passage 19 in the adapter plug provides an open communication or connection between the interior of the bellows 11 and the internal electrolytic portion of its respective battery cell.

At the upper end of tube 11 a check valve housing 23 blocks the tube opening subject to the control of a check valve 27. The check valve housing 23 comprises a plug portion 24 which is pressure fitted into tube 11 to seal off the bellows electrolyte from the immersion liquid. The valve 27 rests on the seat 26 and is normally held thereon by spring 28. A cap 29 secures the valve assembly by means of machine screws 31. A relief passage 30 extends through the valve assembly from the internal portion of the bellows tube 11 which is filled or partially filled with the battery electrolyte 33. The entire device is shown submerged below the ocean surface 32 where it is anticipated such a liquid electrolyte battery may be used when provided with a high pressure compensator and relief valve 10 and the proposed terminal connector 45 at depths of 35,000 to 40,000 feet.

The waterproof terminal connector 45, FIG. 2, is illustrated in detail in FIG. 3 installed on the battery terminal post 36 and held in watertight contact with the potting compound 34. The connector 45 comprises a dielectric body 41 secured to a pole contactor 37. The contactor 37 is threaded at its lower end to fit the special post socket thread 38. A O ring retainer 40 is flanged into the connector body 41 and is provided with an O ring 39 for sealing the base of the body 41 against the surface of the potted battery top 34.

The conductor 43 is connected to a terminal clamp 44 which frictionally engages the top of pole connector 37. The neoprene nipple 42 is provided with an internal clamping groove 47 for clamping to annular ridge 46 on the body 41 and securing the terminal to the post 36.

In the use of a standard electrolytic storage battery immersed directly in the ocean and submerged to great depths, several improvements must be provided to make it operable. First, the battery conductors or terminals on the top of the battery must be potted by a dielectric cover 34, except for areas to be occupied by the substitute filler cap valve and terminal posts connector. A special waterproof terminal connector assembly comprising terminal cover 41 and cable connector 43 has been designed to fasten to the special modified terminal pole 36 whereby waterproof integrity is assured.

Due to the extreme external hydrostatic pressure which would normally crush the battery case, a combination gas relief valve and bellows has been provided to permit equalization of the internal and external pressure on the case at all depths. Another feature of the combination relief valve and bellows is to provide a reservoir for the excess electrolyte. With electrolytes having a specific gravity of approximately 1.220 they may be considered incompressible at 16,000 p.s.i. but at greater pressures in deep trench operations in the ocean pressures in excess of this may be reached. Therefore the inventor herein has provided said polyethylene tube or bellows 11 with a volume calculated to hold at least ten percent (10%) of the total volume of electrolyte found in the individual battery cell and available for absorption into the sponge lead plates under pressure.

With the above improvements the battery is designed for operation while immersed directly in the ocean.

Obviously many modifications and variations of the present invention are possible in the light of the above teachings. It is therefore to be understood that within the scope of the appended claims the invention may be practiced otherwise than as specifically described.

What is claimed is:

1. An electrolyte type battery adapted for underwater operation comprising:
   a battery case having a top equipped wtih electrolyte filler openings and terminal poles,
   said battery case top being potted with a dielectric covering; passageways through said covering for said filler openings and terminal posts,
   a combination pressure cempensator and relief valve affixed to and in watertight relationship with said said filler opening so that external hydrostatic pressure and internal cell pressure will equalize at all depths and the internal excessive electrolytic gas pressure will be automatically relieved
   and a waterproof terminal pole connector and conductor assembly affixed to and in watertight relationship with said terminal pole so that said battery can be operated while completely immersed.

2. A battery as described in claim 1 wherein:
   said pressure compensator comprises a resilient tube bellows and electrolyte reservoir closed at its outer end and connected by a passage at its lower end through the filler opening to the battery cell,
   said tube and cell being filled wtih electrolyte so that changes in the external hydrostatic pressure on the bellows will be balanced by equal changes in the internal electrolyte pressure.

3. A battery as described in claim 2 wherein:
   said bellows and electrolyte reservoir is closed at its outer end by a combination check and relief valve so that excessive internal electrolyte gas pressure caused by charging or discharging said battery can be relieved by said valve but external sea water cannot enter regardless of its hydrostatic pressure.

4. A battery as described in claim 2 wherein:
   said resilient tube bellows and electrolyte reservoir has a volume calculated to hold at least ten percent of the total volume of electrolytic capacity of the individual battery cell.

5. A battery as described in claim 1 wherein:
   said waterproof terminal pole connector assembly comprises a threaded bore in the top of the battery terminal post,
   a pole contactor mounted in a dielectric body and extending beyond the body at each end,
   said contactor being threaded at its lower extension to fit said threaded bore in the top of the battery terminal post,
   waterproof cable connector detachably secured to the upper extension of said pole contactor and in frictional engagement therewith,
   and means for sealing said dielectric body and terminal post including an O ring bearing on the potting compound.

6. An automatic high pressure compensator and relief valve connected to a liquid filled battery adapted for immersion in a liquid medium, comprising:
   a bellows in the form of a thin walled cylindrical plastic tube,
   an adapter plug externally sealing the lower end of said plastic tube,
   said adapter plug being provided with a threaded portion to fit the threaded filler cap opening in the battery cell,
   an open passage through said adapter plug connecting the interior of a battery cell to its respective bellows;
   a check valve housing externally sealing the upper end of said plastic tube,
   a passage through said housing connecting the interior of said bellows to the exterior thereof,
   a check valve means in said housing passage so that the internal gas under pressure will be automatically relieved but an external fluid surrounding said bellows will be blocked from passing said valve at any pressure,
   and the bellows, battery case and connecting passage being filled with the battery electrolyte so that compression of the bellows by external hydrostatic pressure will immediately increase the internal pressure in the battery case and equalize the internal and external pressure on the case walls.

7. An automatic high pressure compensator and relief valve connected to a liquid filled battery adapted for immersion in a liquid medium, comprising:
   a bellows in the form of a thin walled cylindrical plastic tube,
   an adapter plug externally sealing the lower end of said plastic tube,
   said adapter plug being provided with a threaded portion to fit the threaded filler cap opening in the battery cell,
   an open passage through said adapter plug connecting the interior of a battery cell to its respective bellows,
   a check valve means externally sealing the upper end of said bellows so that internal gas under pressure will be automatically relieved but the external fluid surrounding said bellows will be blocked from passing said valve at any pressure,
   and the bellows, battery case and connecting passage being filled with the battery electrolyte so that compression of the bellows by external hydrostatic pressure will immediately increase the internal pressure in the battery case and equalize the internal and external pressure on the case walls.

8. An automatic high pressure compensator and relief valve connected to a liquid filled battery adapted for immersion in a liquid medium, comprising:
   a bellows in the form of a thin walled cylindrical plastic tube,
   a plug adapter to fit the threaded cell cap opening and externally seal the lower end of said tube, said plug being provided with an axial passage,
   a check valve housing externally sealing the upper end of said plastic tube,
   a passage through said housing connecting the interior of said bellows to the exterior thereof,
   a check valve means in said housing passage designed so that the internal gas under pressure will be automatically relieved but an external fluid surrounding said bellows will be blocked from passing said valve at any pressure,
   and the bellows, battery case and connecting passage being filled with the battery electrolyte so that compression of the bellows by external hydrostatic pressure will immediately increase the internal pressure in the battery case and equalize the internal and external pressure on the case walls.

9. An automatic high pressure compensator and relief valve connected to a liquid filled battery adapted for immersion in a liquid medium, comprising:
   a bellows in the form of a thin walled cylindrical plastic tube,
   a plug adapted to fit the threaded cell cap opening and externally seal the lower end of said tube, said plug being provided with an axial passage,
a check valve means externally sealing the upper end of said bellows so that internal gas under pressure will be automatically relieved but an external fluid surrounding said bellows will be blocked from passing said valve at any pressure,
and the bellows, battery case and connecting passage being filled with the battery electrolyte so that compression of the bellows by external hydrostatic pressure will immediately increase the internal pressure in the battery case and equalize the internal and external pressure on the case walls.

References Cited by the Examiner

UNITED STATES PATENTS 2,930,828  3/60  Herold _____ 136—181

FOREIGN PATENTS 160,271  12/54  Australia.
424,102  2/35  Great Britain.

WINSTON A. DOUGLAS, *Primary Examiner.*
JOHN H. MACK, *Examiner.*